United States Patent [19]

Kresge, Sr.

[11] 4,169,420
[45] Oct. 2, 1979

[54] ROOT FEEDER

[76] Inventor: Emmett S. Kresge, Sr., 21 Hathaway Ave., Enfield, Conn. 06082

[21] Appl. No.: 919,620

[22] Filed: Jun. 27, 1978

[51] Int. Cl.² ........................................... A01G 29/00
[52] U.S. Cl. ..................................... 111/7.1; 111/7.4; 239/315
[58] Field of Search .................. 111/7.1, 7.2, 7.3, 7.4; 137/268; 239/315

[56] References Cited

U.S. PATENT DOCUMENTS

| | | | |
|---|---|---|---|
| 445,510 | 1/1891 | Black | 111/7.1 |
| 1,010,819 | 12/1911 | Thompson | 47/48.5 |
| 2,018,003 | 10/1935 | Axtell | 111/7.1 |
| 2,145,934 | 2/1939 | Kingman | 47/48.5 |
| 2,604,446 | 7/1952 | Palmer | 137/268 X |
| 2,797,132 | 6/1957 | Alpert | 239/315 X |
| 2,814,528 | 11/1957 | Blasczyk | 239/315 |
| 2,850,992 | 9/1958 | Hooper et al. | 111/7.1 |
| 2,875,713 | 3/1959 | Shoffner | 111/7.1 |
| 2,902,953 | 9/1959 | Young | 111/7.1 |
| 2,908,445 | 10/1959 | Schwartz | 239/315 X |
| 3,091,197 | 5/1963 | Henry | 111/7.1 |
| 3,289,418 | 12/1966 | Edgerton | 111/7.3 |
| 3,290,821 | 12/1966 | Parry | 47/48.5 |
| 3,598,068 | 8/1971 | Rosendahl | 111/7.1 |
| 3,856,205 | 12/1974 | Rohling | 47/48.5 X |

Primary Examiner—Edgar S. Burr
Assistant Examiner—Steven A. Bratlie
Attorney, Agent, or Firm—Ross, Ross & Flavin

[57] ABSTRACT

A root feeder wherein a closed housing defining a mixing chamber has a restricted water feed inlet and a fertilizer feed inlet and a plurality of tines communicating with the chamber and extending outwardly therefrom, the tines having outlet ports at their outboard ends and having open inboard ends so disposed relative to the mixing chamber as to insure a thorough mixing within the chamber due to a generated churning of the water and fertilizer before charge into the tines and feed from the ports thereof to the soil in which the root feeder is embedded.

2 Claims, 4 Drawing Figures

ROOT FEEDER

A primary object of the invention is to provide a sturdy, inexpensive portable root feeding device which is easy to use, will not damage plants or roots, and is extremely economical in its use of water.

Tests have shown that the root feeder hereof utilizes 9.8 pints of water per minute, while an ordinary garden hose uses 57.2 pints per minute.

As another feature, the root feeder of the invention can be used with liquid or granular soluble fertilizers simultaneously with watering or for watering alone. Herein, fertilizer and water are mixed completely by a pressurized jet action and diffused within a mixing chamber due to an enforced churning action so that the fertilizer is completely dissolved within the fluent material by the time the mixture is dispensed.

It waters and fertilizes the root structure only, in a very gentle manner. Since it waters and fertilizes only below ground, its use restricts weed nourishment and growth, while avoiding damage to plants where foliage should not be watered.

The root feeder may be moved easily, even when attached to a hose and with the water running, all without stooping, and one or a plurality of the units may be used in tandem.

One unit will feed an area of approximately five to six feet in diameter in a five minute period.

The unit lends itself to automatic water control or linkage to timing devices.

The foot feeder is preferentially made of plastic so as to enable it to accept alkaline or acid fertilizers or other ingredients without damage.

It can be used to disperse fungicides at the root level without the danger of the fungicides affecting the leaf portions of the plants being served.

PRIOR ART STATEMENT

The following is a listing of the patents, publications or other information which the applicant believes to be the closest prior art of which he is aware:

U.S. Letters Pat. Nos.:
1,010,819 2,145,934 2,850,992 2,875,713 2,902,953 3,290,821 and 3,856,205.

Copies of the listed patents are attached hereto.

The patents are believed to be relevant in that they disclose various root feeding devices.

None is believed to disclose the features of Applicant's construction which includes a restricted inlet for water into a closed mixing chamber having tines extending thereinto and so disposed in the mixing chamber as to insure thorough mixing due to a generated churning and constant feed of the water and/or water fertilizer mixture into the tines and outwardly therefrom through provided ports to the soil in which the tines are imbedded.

Figure 1:
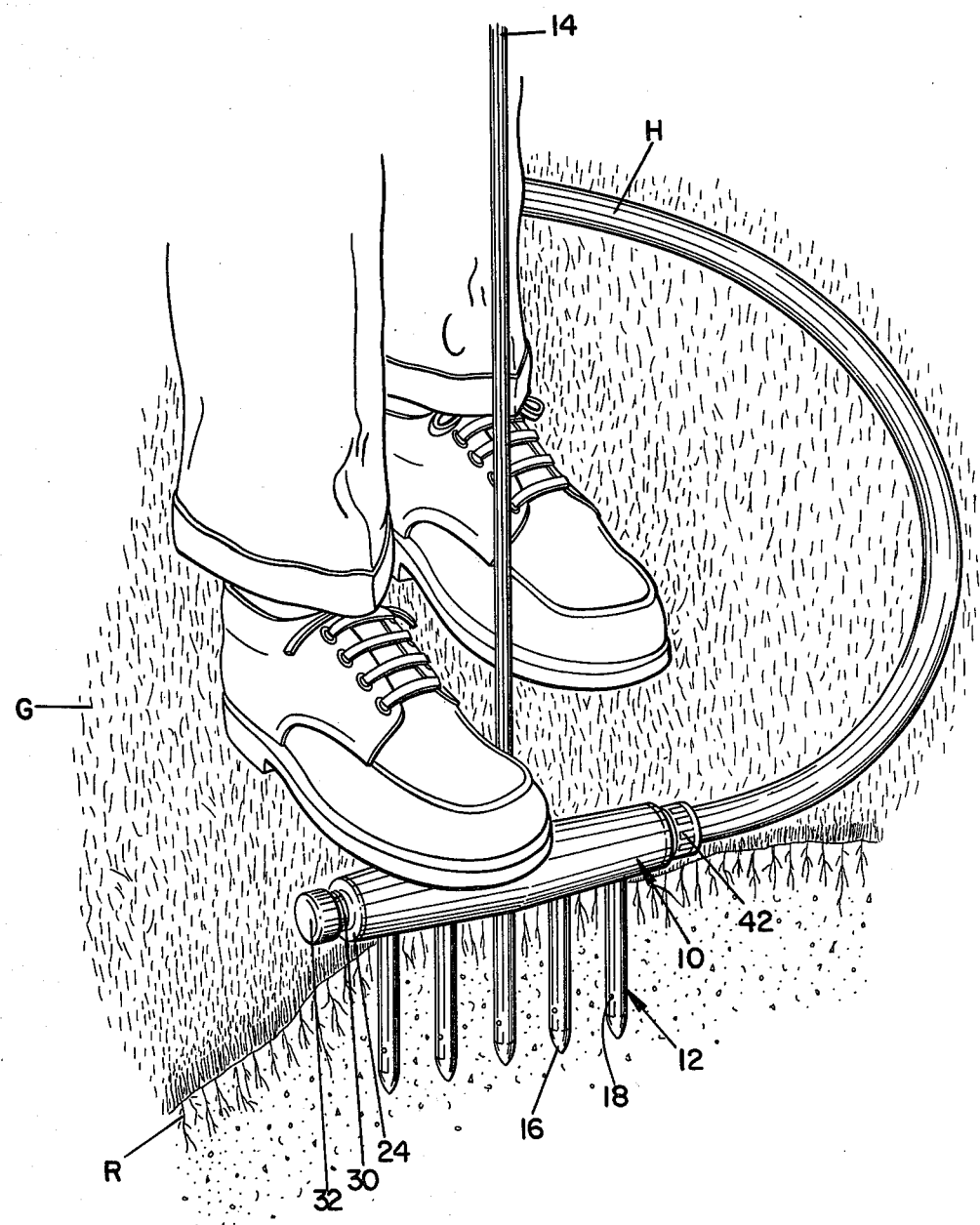
FIG. 1 is a perspective view showing the root feeder of the invention in use.
Figure 2:
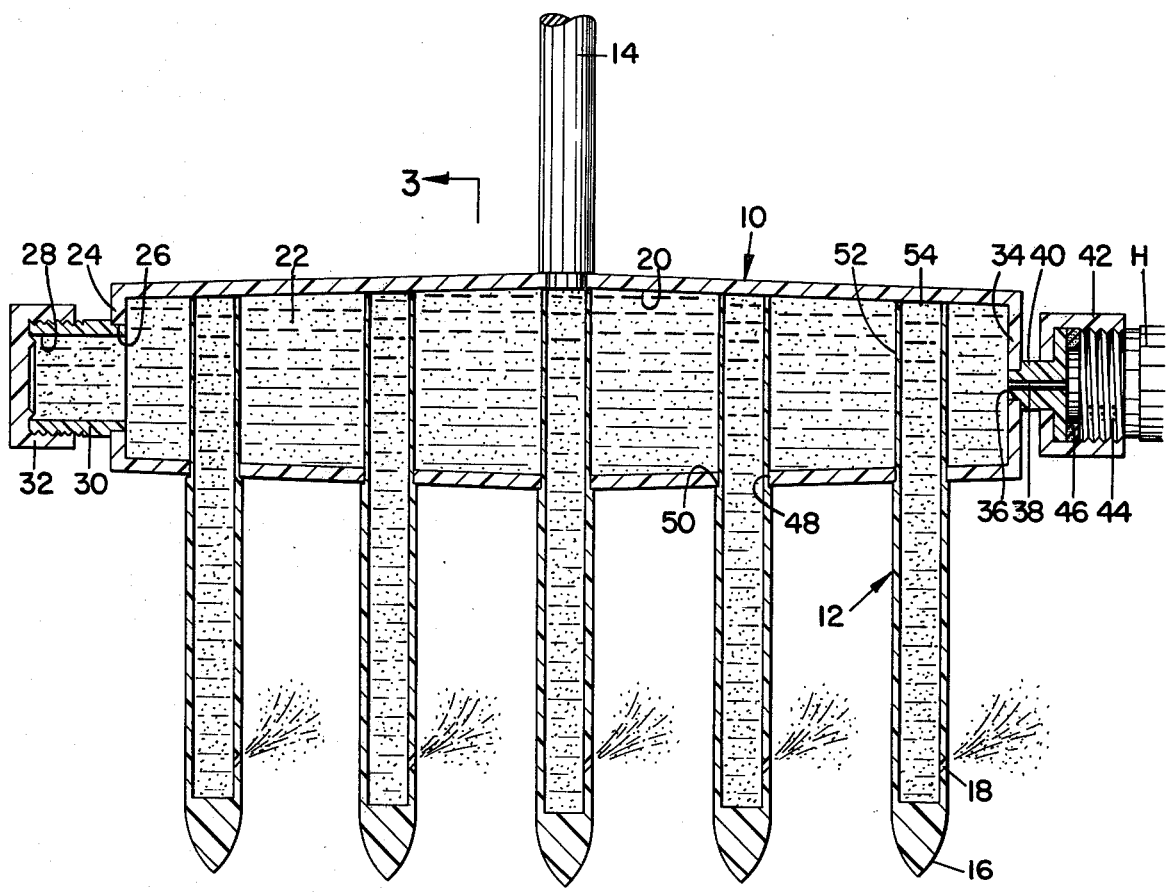
FIG. 2 is an enlarged transverse sectional view taken through the root feeder of FIG. 1.

The root feeder is preferably formed from a heavy gauge, light-weight, wear-resistant, non-corrosive, plastic material such as PVC and includes a somewhat cylindrical, hollow housing 10 having a plurality of tubular tines 12 depending from the lower surface thereof and an upright shaft 14 extending upwardly from the upper surface thereof.

The lower free ends of the tines taper to points 16 for facilitating their insertion into the ground G. Suitable ports 18 are provided in the tines upwardly of the points 16.

The root feeder is used easily without stooping in the manner illustrated in FIG. 1 with the user placing his foot on the upper surface of the housing 10 while grasping the shaft 14, which may be provided with a handle, not shown, and exerting a downward force to drive the tines 12 into the ground so that the ports 18 are disposed adjacent the roots R. The root feeder can be moved simply by pulling upwardly on the shaft 14, again without stooping.

The upper and lower walls of housing 10 are curved and define a cylindrical mixing chamber 20 for receipt of water alone or fertilizer and water, the resultant mixture being indicated by 22.

A first end wall 24 of the housing is provided with a central port 26 extending therethrough and communicating with a through-passage 28 of an externally threaded connector 30 fixed to and extending horizontally outwardly from end wall 24, the connector 30 and port 26 serving as an inlet for charging fertilizer into chamber 20. Following such charging, connector 30 may be closed off by a cap 32 threaded thereon.

A second end wall 34 is provided at the opposite end of the housing and has a central port 36 extending therethrough and communicating with a through-passage 38 of restricted diameter of a valve 40 fixed to and extending horizontally outwardly from end wall 34.

Valve 40 is sleeved by an internally threaded coupling 42 mounted for rotation thereon and adapted to receive the mating threaded coupling 44 of a hose H in threaded engagement therewith, a washer 46 being disposed between the end of hose coupling 44 and the face of valve 40 for a fluid-tight connection.

A plurality of root feeders may be joined in tandem by lengths of hose or with the coupling 42 of one unit being threadedly engaged with the connector 30 of another unit.

Tines 12 are received in the manner of a press fit in spaced openings 48 provided in the lower surface of housing 10, the tines being provided with a circumferential shoulder 50 which abuts the housing lower surface to positively locate the tines relative to the housing.

An upper portion 52 of each tine extends into chamber 20 and has a flat upper extremity 54 disposed in contact with the curved upper wall of housing 10.

Figure 3:
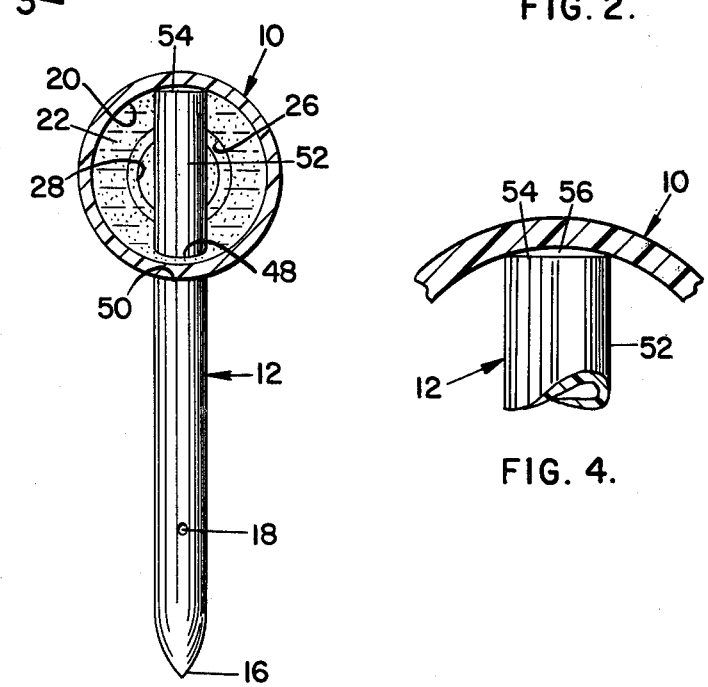
FIG. 3 is a cross-sectional view taken on line 3—3 of FIG. 2.
Figure 4:
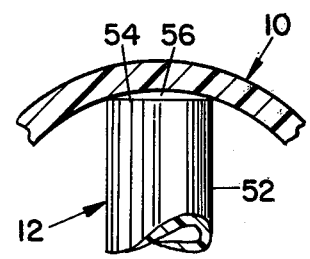
FIG. 4 is an enlarged fragmentary cross sectional view similar to FIG. 3 showing the disposition of the upper end of a tine within the root feeder mixing chamber.

Due to the curvature of the housing upper wall, a space 56 exists between the housing upper wall and the flat upper extremity 54 of the tine, thereby providing an extremely restricted through passage opening from the front and rear of the tine as viewed in FIG. 3 through which the mixture 22 must pass to enter the tines. Such restricted passage insures a thorough mixing due to a generated churning of the water and fertilizer before charge into the tines.

The length of the upper portions 52 of the tines also precludes movement of the fertilizer directly into the tines without mixing with the water, as would occur were the upper ends of the tines flush with the lower wall of the housing.

Contact of the upper ends of the tines with the housing wall assures a better mixing of the water and fertilizer under the jet action of the water being admitted to chamber 20 through restricted passage 38 of valve 40 and restricted space 56 also insures constant feed of the mixture in a sucking action into the open upper ends of the tines and out through the ports 18 adjacent the lower ends of the tines.

I claim:

1. A root feeder comprising, a housing having interconnected curved upper and lower walls defining a cylindrical mixing chamber with closed ends, an inlet for charging fertilizer into the mixing chamber, a water inlet in one end connected to a source of water for charging water into the mixing chamber, a valve having a restricted through passage in the water inlet, and a plurality of tubular tines communicating with the mixing chamber and extending outwardly from the lower wall of the housing, the tines having outlet ports at one end thereof and having opposite open ends extending into the mixing chamber, the open ends of the tines being flat and disposed in contact with the curved upper wall of the housing to define a restricted opening above each tine for insuring a thorough mixing of the water and fertilizer through a churning action and constant feeding of the mixture in a sucking action into the open ends of the tines.

2. A root feeder according to claim 1, including a shaft extending outwardly from the upper wall of the housing for facilitating movement and use of the root feeder.

* * * * *